United States Patent [19]
Lang et al.

[11] Patent Number: 5,699,262
[45] Date of Patent: Dec. 16, 1997

[54] VIDEO RENTAL PROCESSING SYSTEM

[75] Inventors: David Lang, Weatherford; Donald G. Hines; Mark H. Hines, both of Garland, all of Tex.

[73] Assignee: Dralco, Inc., Weatherford, Tex.

[21] Appl. No.: 505,827

[22] Filed: Jul. 18, 1995

[51] Int. Cl.$^6$ .................................................. G06F 17/00
[52] U.S. Cl. .................. 364/478.01; 360/69; 194/906
[58] Field of Search .................. 364/478.01, 478.06, 364/479.12, 479.13; 360/92, 71, 69, 74.1–74.7; 221/88; 235/381, 383; 242/344; 194/212, 906

[56] References Cited

U.S. PATENT DOCUMENTS

| | | | |
|---|---|---|---|
| 4,563,120 | 1/1986 | Josserand | 414/273 |
| 4,598,810 | 7/1986 | Shore et al. | 221/88 |
| 4,632,335 | 12/1986 | Dickson et al. | 242/344 |
| 4,647,989 | 3/1987 | Geddes | 235/381 |
| 4,654,727 | 3/1987 | Blum et al. | 360/71 |
| 4,789,054 | 12/1988 | Shore et al. | 194/212 |
| 4,812,629 | 3/1989 | O'Nell et al. | 235/383 |
| 4,839,505 | 6/1989 | Bradt et al. | 235/381 |
| 4,866,661 | 9/1989 | de Prins | 235/381 |
| 5,007,518 | 4/1991 | Crooks et al. | 194/906 |
| 5,143,193 | 9/1992 | Geraci | 221/88 |
| 5,392,927 | 2/1995 | Haverkamp Begemann et al. | 209/583 |
| 5,434,832 | 7/1995 | Beal et al. | 360/92 |

OTHER PUBLICATIONS

Video Drop Brochure published by Dralco, Incorporated (date unknown).

Primary Examiner—Reba I. Elmore
Assistant Examiner—Steven R. Garland
Attorney, Agent, or Firm—James E. Bradley

[57] ABSTRACT

A method and apparatus are provided for automatically processing returned video cassettes to determine that the appropriate tape cartridges are matched with the appropriate cases, to assure that the tape cartridges are fully rewound, to check the video cassettes back into inventory and then to sort the cassettes by selected entertainment categories for reshelving. A feed chute is provided for receiving the cassettes and passing them to a size sorter for detecting the sizes of the cassettes. Cassettes of inappropriate sizes are then ejected from processing and placed in an unprocessed return staging bin. Cassettes of the appropriate size are then passed through an orientation detection and orientating section in which the video cassette cases are oriented in a particular alignment for presenting to a rewind and bar code reading system. The video cassettes are then automatically checked for an appropriate match between the tape cartridges and the cases. If a mismatch is detected, the inappropriately matched tape cartridges and the inappropriately matched cases are held within an internal staging area for matching with the appropriate cases and tape cartridges, respectively. Video cassettes are automatically rewound and then automatically sorted according to the entertainment categories.

9 Claims, 7 Drawing Sheets

VIDEO RENTAL PROCESSING SYSTEM

BACKGROUND OF THE INVENTION

1. Field of the Invention

The present invention relates in general to processing equipment for processing video rental returns of video software, and in particular to equipment for automatically processing returned video cassettes.

2. Description of the Prior Art

Video rental stores are currently manually processing video rental returns of video software such as video tape cassettes, video games and video laser discs. Typically, a video store employee manually enters receipt of video rental returns into a host computer for inventory tracking, and manually processes the video rental returns. For example, when video tape cassettes having video tape cartridges and opaque cases are being processed, the video store employee will open each case to manually determine whether the video tape cartridges are stored in appropriately matching, corresponding cases. The employee will usually visually check the titles on the cases and on the video tape cartridges. Then, the employee will check each video tape cartridge to see if the video tape cartridges are fully rewound, and if not, the employee will place the video tape cartridges in a rewind machine, rewind the tape cartridges and place the tape cartridges back within respective ones of the cases.

Once the employee manually verifies that the appropriate tape cartridges are within the appropriate cases, and fully rewound, then the employee will reshelve the video cassettes. Video cassettes may be manually sorted according to various types of selected entertainment categories to aid the employee in reshelving. If not, the employee runs to various areas of the store to place the returned video cassettes on the appropriate display shelves, or stocking shelves, for redistribution to other customers. This process is very time consuming, utilizing many man hours to manually check each of the video cassettes and manually sort the cassettes for reshelving.

SUMMARY OF THE INVENTION

A method and apparatus are provided for automatically processing returned video cassettes to determine that the appropriate tape cartridges are matched with the appropriate cases, to assure that the tape cartridges are fully rewound, to check the video cassettes back into inventory and then to sort the cassettes by selected entertainment categories for reshelving. A feed chute is provided for receiving the cassettes and passing them to a size sorter for detecting the sizes of the cassettes. Cassettes of inappropriate sizes are then ejected from processing and placed in an unprocessed return staging bin. Cassettes of the appropriate size are then passed through an orientation detection and orientating section in which the video cassette cases are oriented in a particular alignment for presenting to a rewind and bar code reading system. The video cassettes are then automatically checked for an appropriate match between the tape cartridges and the cases. If a mismatch is detected, the inappropriately matched tape cartridges and the inappropriately matched cases are held within an internal staging area for matching with the appropriate cases and tape cartridges, respectively. Video cassettes are automatically rewound and then automatically sorted according to the entertainment categories.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
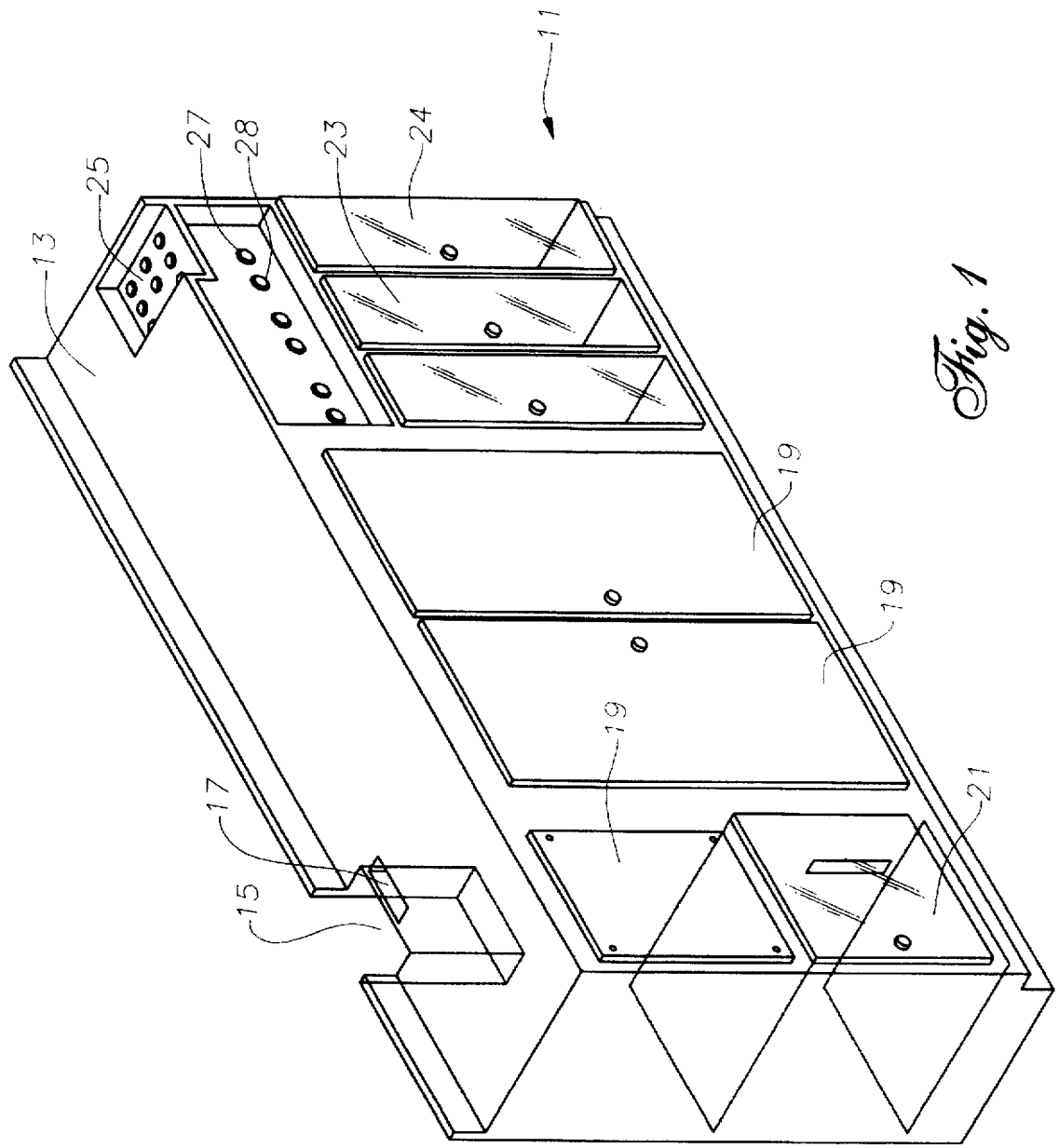
FIG. 1 depicts a perspective view of a video rental processing system made according to the present invention for automatically processing of returned rentals of video cassettes.

FIG. 1 is a perspective view of video rental processing system 11 of the present invention. Processing system 11 is enclosed within cabinet 13, which has drop box interface slot 15 and inside drop 17. Drop box interface slot 15 is provided for customers to return video cassettes and may be connected to a slot outside of the video rental store. Inside drop 17 is for store personnel and others to insert video cassettes into the video rental processing system 11.

Access doors 19 are for accessing mechanical and electrical components of processing system 11, and for removing video cassettes from processing system 11. Unprocessed return storage bin 21 is a temporary storage, or staging area, for cassettes which are not processed through video rental processing system 11, such as cassettes of a wrong or an odd size for processing through system 11. Processing system 11 will automatically pass cassettes of an inappropriate size for processing within system 11 into unprocessed return storage bin 21. In the case of a malfunction or loss of power to system 11, if system 11 is full, or if access doors 19 are open, all cassettes being received into processing system 11 are bypassed from processing system 11 and placed into unprocessed return storage bin 21. When the power to processing system 11 is turned off, all cassettes which are dropped through drop slot 15 and inside drop 17 will be passed directly to unprocessed return storage bin 21 rather than being staged for processing through video rental processing system 11.

Discharge staging area 23 includes separate storage bins which receive video cassettes after they are processed in passing through video processing system 11. Discharge staging area 23 has clear, transparent access doors 24 on the front side of cabinet 13 so that persons may view the names of displayed cassette titles on the exterior of the video cassettes disposed in the bins of discharge area 23. The hinges of the cassettes, upon which the titles are preferably displayed, will be oriented by processing system 11 to face toward the front of cabinet 13 so that the titles of videos displayed on the hinges may be viewed through the transparent access doors 24.

Control panel 25 includes various control switches and status indicator lights. Separate stack indicator lights 27 are located above different bins in discharge staging area 23 to indicate when particular ones of the bins are beginning to fill. Typically, one of stack indicator lights 27 will flash with increasing frequency as a respective one of the bins in discharge staging area 23 approaches being filled to capacity. Push buttons 28 are also provided for a video store employee to cause a stack of video cassettes to be moved forward within separate ones of the bins in discharge staging area 23.

Figure 2:
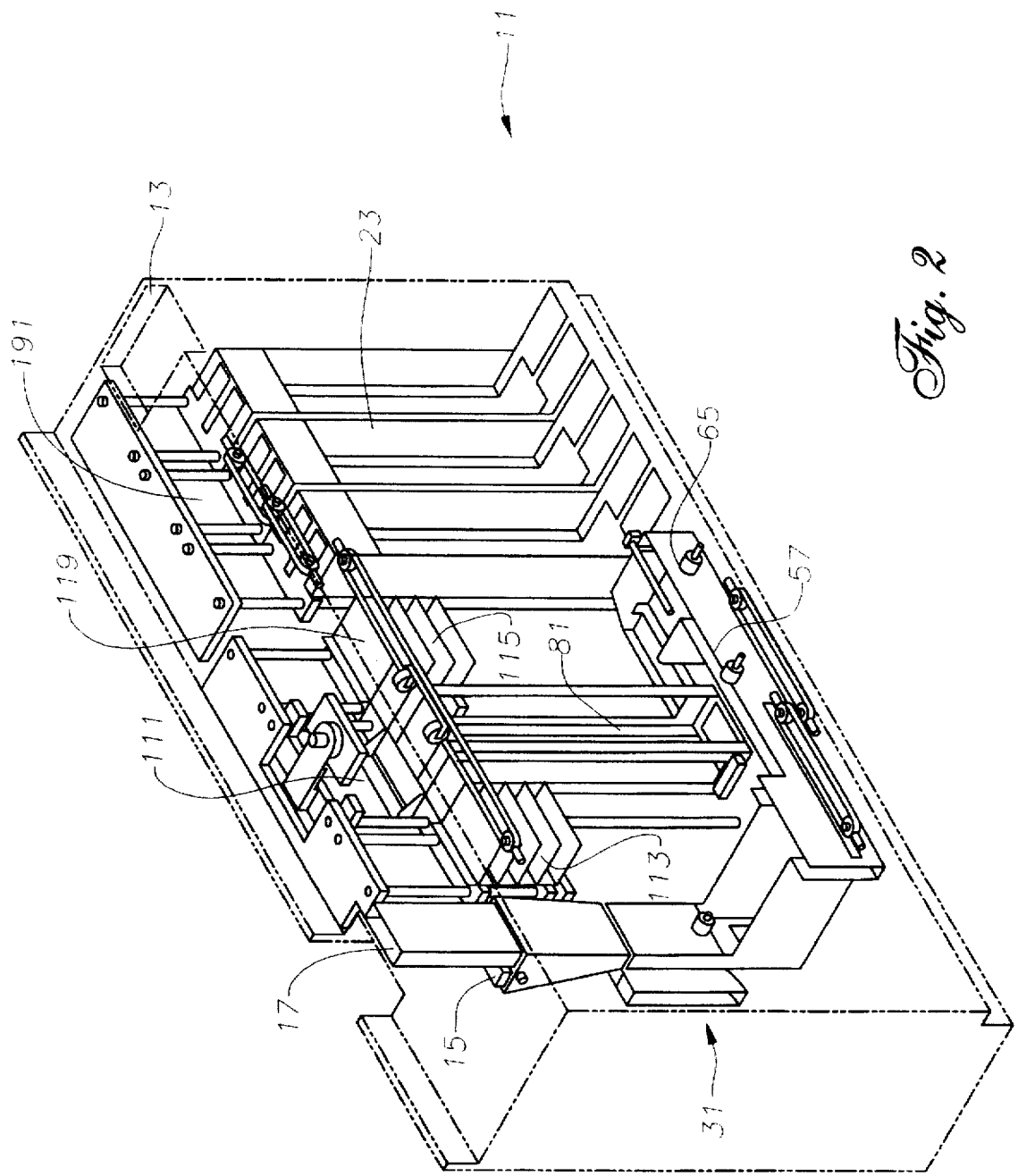
FIG. 2 depicts a perspective view of the internal portion of the video rental processing system of FIG. 1, with the exterior case shown in phantom.

FIG. 2 is a perspective view of the interior components of video rental processing system 11, with cabinet 13 shown in phantom. Processing system 11 includes feed means 31 for receiving cassettes from drop box interface slot 15 and inside drop 17, and transporting the cassettes within processing system 11. Drop box interface slot 15 and inside drop 17 are depicted in FIG. 2 as being located on the rearward side of video rental processing system 11. A forward portion of feed means 31 is shown more clearly in FIG. 3.

Figure 3:
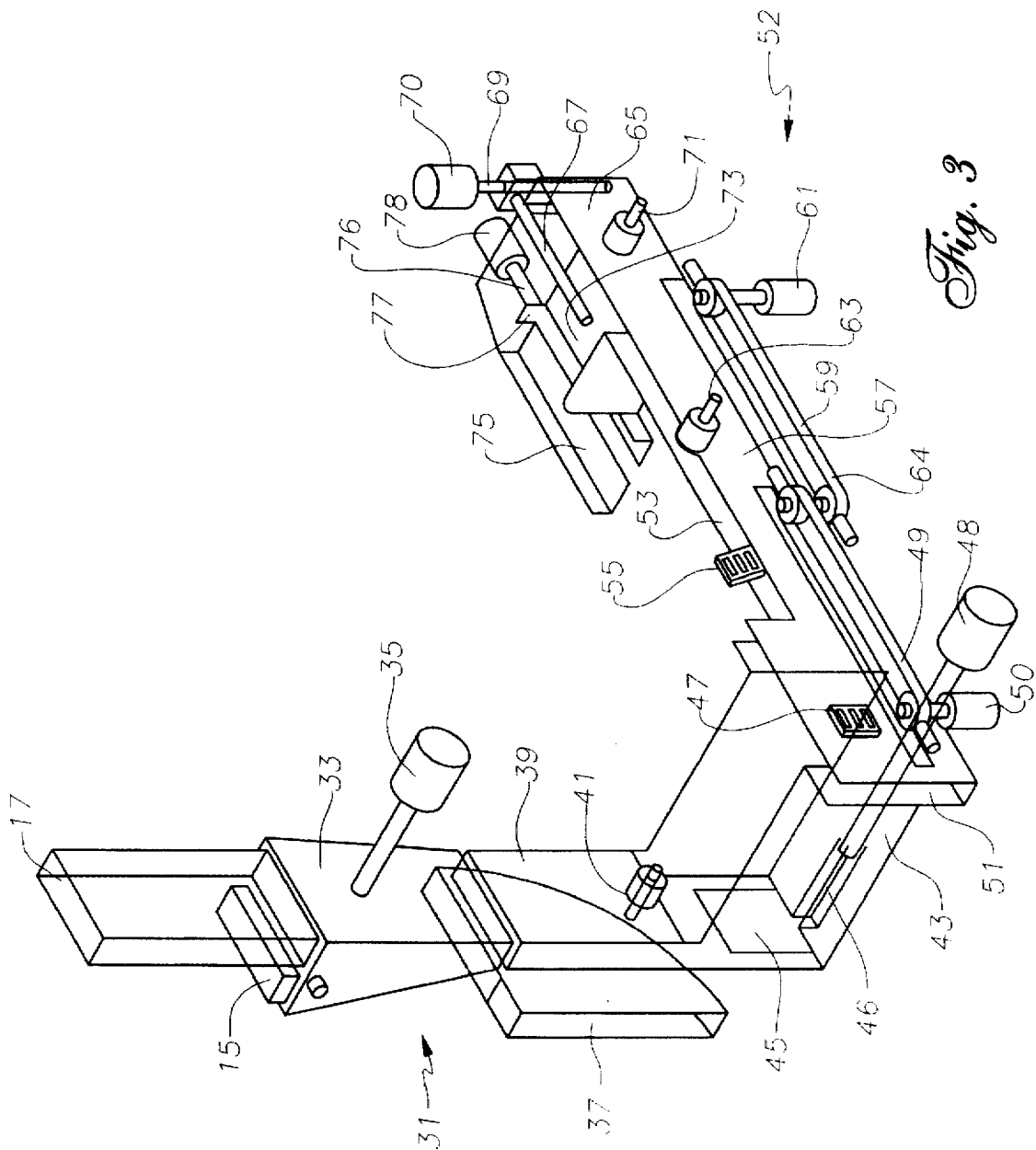
FIG. 3 is a perspective view depicting a cassette feed chute and orienting section for the video rental processing system of FIG. 1.

Referring to FIG. 3, the forward portion of feed means 31 includes feed chute 33 which is selectively actuated by bypass actuator 35 to pass cassettes to either bypass chute 37 or staging chute 39. Bypass actuator 35 is an electric solenoid which is shown in FIG. 3 in the actuated position. When power is not supplied to bypass actuator 35, feed chute 33 will be rotated to position in alignment with bypass chute 37, in a fail-safe position, so that returned video cassettes will not stack up within feed means 31. Thus, when video rental processing system 11 is turned off, cassettes will fall downward through feed chute 33 to bypass chute 37 for collection in unprocessed return storage bin 21 (depicted in FIG. 1). Additionally, if a system malfunction is detected within video rental processing system 11, if the system is filled to capacity, or if for some other reason system 11 can not accept any more cassettes for processing, electric power is automatically removed from actuator 35 so that the cassettes passing through feed chute 33 will fall from feed chute 33 into bypass chute 37. An operator can also manually actuate bypass actuator 35 to pass cassettes into bin 21.

When video rental processing system 11 is being operated to process cassettes, bypass actuator 35 is actuated to the position shown in FIG. 3. Cassettes will fall through feed chute 33 and downward into staging chute 39. It should also be noted that the widths of drop slot 15 and inside drop 17 are such that cassettes can only be dropped into drop box interface slot 15 and inside drop 17, and fall through feed chute 33 and chute 39, with the lengths, or longer dimensions of the cassettes, aligned in a vertical orientation and the widths, or shorter dimensions of the cassettes, aligned in a horizontal orientation. In other embodiments of the present invention, a preferred orientation of the cassettes may be achieved by other means, such as by strategically placing structural components along a path through which the cassettes travel to align the cassettes in the preferred orientation. Such structural components of alternative embodiments may be placed along a funnel shaped pathway through which the cassettes travel.

Cassettes passing through chute 39 will be staged by feed control pin 41 to selectively fall into staging shelf 43 depending upon the position of feed control pin 41. Feed control pin 41 is connected by a linear solenoid actuator which selectively moves pin 41 into chute 39 to block passage of cassettes through chute 39, or moves pin 41 outward from within chute 39 to allow the cassettes to pass from the bottom of chute 39 onto staging shelf 43. If plate 45 is not in a rearward position or if there is not enough room in the rearward portion of staging shelf 43 for receipt of a cassette, feed control pin 41 will remain inserted into chute 39 to prevent passage of cassettes from within chute 39, downward onto staging shelf 43. When plate 45 is in a rearward position and there is adequate room on shelf 43, pin 41 will be withdrawn from within chute 39 to allow passage of cassettes downward and onto staging shelf 43. It should be noted that when cassettes enter staging shelf 43, they remain oriented with the lengths aligned to extend in vertical directions and widths aligned to extend in horizontal directions.

Plate 45 pushes the cassettes located on staging shelf 43 forward to the front of staging shelf 43, away from chute 39. Plate 45 is preferably connected to a ball and rotary driven screw type drive 46, which is selectively powered by stepper motor 48 to move plate 45 for selected distances. Plate 45 pushes cassettes forward into alignment with a sensor array 47. There may be several cassettes against which plate 45 is pushing at one time, however, the forward most cassette will align with sensing array 47. Cassettes are pressed against conveyor belt 49.

Sensor array 47 detects the height of cases to determine whether the cases in the forward most position on shelf 43 is for an odd-sized cassette, which is not of the appropriate size for passing through video rental processing system 11. For example, game rental cases are usually shorter in length and slightly wider than video rental cassettes and are preferably not processed within video rental processing system 11. Cases of inappropriate sizes, such as game cases, will be moved by conveyor belt 49 and pass through discharge opening 51. In other embodiments of the present invention, other types of video rental units of different types of video software media, such as game cases and compact disc cases, may be processed either individually or together with different combinations of these other types of video rental media.

Sensing array 47 is preferably an array of four microswitches, with one microswitch for sensing the presence of a cassette, two microswitches determining the height of video cassette cases to detect whether a game case or video cassette is being detected, and a fourth microswitch for sensing unusually tall cases.

Conveyor belt 49 is powered by stepper motor 50 to selectively move in either of two directions. Conveyor belt 49 may be selectively moved in a first direction for moving odd sized cassettes outward from the forward most position on staging shelf 43 to the left, as viewed in FIG. 3, and through discharge opening 51. Discharge opening 51 passes the cassettes of inappropriate sizes through discharge opening 51 and to unprocessed return storage bin 21. There, cassettes of the inappropriate size may be manually processed by personnel for returning to stock within the store. Conveyor belt 49 may also be selectively moved in a second direction for passing cassettes of the correct size to the right, as viewed in FIG. 3, for further processing within video rental processing system 11. Cassettes of the appropriate size are transported along orientation chute 53, which is also part of feed means 31.

Cassettes are passed from staging shelf 43 into chute 53 with the lengths of the cases aligned vertically and the widths of the cases aligned horizontally. Cassettes are also transported within orientation chute 53 by conveyor belt 59, which is powered by stepper motor 61. Idler pulleys for belts 49 and 64 are mounted to a common shaft 64, and are free to separately rotate on shaft 64 so that belts 49 and 59 will operate independently of each other.

Orienting means 52 includes orientation chute 53, hinge orientation section 57 and lid orientation section 65. Cassettes are selectively rotated in orienting means 52 for ninety (90) degrees, twice, about two axes of the cassettes, which are perpendicular, to orient the hinges of cases to face outward, toward the front of video rental processing system 11, and to orient the lids to face upwards upon discharge from orienting means 52. In hinge orientation section 57, the cassettes are first rotated 90 degrees around an axis of the cassettes which is perpendicular to the largest flat sides of the cassette cases and the lids of the cassette cases. Then, in lid orientation section 65, the cassettes are rotated 90 degrees about an axis of the cassettes which is parallel to both the flat sides of the cassettes and to the lengths for the cassettes. The directions in which cassettes are rotated within hinge orientation section 57 and lid orientation section 65 are selectively coordinated for each cassette by selecting the directions in which each of the cassettes are rotated based upon the initial orientation of cassettes entering chute 53.

Orienting means 52 further includes an array of sensors 55 which are disposed along the top of chute 53 for detecting a tab 58 which fits into notch 56 (shown in FIG. 5) when the case is closed. Tab 58 (shown in FIG. 5) is located in a selected position in the cases of video cassettes being passed through chute 53. A notch 56 and tab 58 (shown in FIG. 5) are located on each end of the video cassette, the same distance from the hinge. Sensors 55 are an array of three microswitches which detect the orientation of cassettes by detecting the relative position of tab 58 in the lid 125 which fits into notch 56 (shown in FIG. 5) in the cases for each of the cassettes. Two of the microswitches are aligned in a horizontal plane on each side of chute 53 for detecting tab 58. One microswitch is also aligned proximately in the same horizontal plane with the other two microswitches, located in the center of chute 53 for detecting when the hinge is encountered.

As a video cassette is passing through chute 53, with the length, or long end, of the video cassette oriented in a vertical direction, one of tabs 58 will be disposed upwards, on an uppermost end of the video cassette at a known distance from the hinge of the video cassette. The two microswitches on the sides of chute 53 will detect the uppermost tab 58. The third microswitch in the center of chute 53 will detect when the hinge is encountered. By knowing on which side of chute 53 tab 58 is located, in combination with knowing whether the hinge is encountered by the third, center microswitch either before or after the one of the two side microswitches encounter tab 58, the initial orientation of a video cassette within chute 53 can be determined by processing system 11. This provides the orientation of the lids and hinges of the video cassettes passing through chute 53. As is discussed below, this initial orientation of the hinges and lids of the cassettes is processed to determine the directions of rotation about the two axes of the cassettes which the cassettes are rotated.

Hinge orientation pin 63 is located along chute 53 and is selectively actuated to either extend into and laterally across chute 53 at right angles to the direction of travel of a cassette through chute 53, or to remain withdrawn from chute 53, depending upon the direction in which a cassette passing within chute 53 is to be rotated. If processing system 11 determines that a cassette should be rotated in a counter-clockwise direction, as viewed from the front of system 11, then pin 63 will be selectively extended into and across the cassette path in chute 53. As a cassette passes through chute 53, the top of the cassette will hit pin 63 as conveyor belt 53 moves the cassette towards lid orientation section 65. This causes the cassette to rotate in the counter-clockwise direction and the length of the cassette to fall downward from vertical alignment to extend in a horizontal direction. The width of the cassette will then extend in a vertical direction.

If processing system 11 selects to rotate a cassette in a clockwise direction, as viewed from the front of system 11, within hinge orientation section 57, orientation pin 63 will be retracted from extending across chute 53 and then belt 59 will convey the cassette past orientation pin 63. The cassette will remain with its length extending in a vertical direction. Then, once the cassette is all of the way past pin 63, pin 63 will be extended into and across chute 53. Conveyor belt 59 will then reverse the direction in which it is moving to move the cassette back toward pin 63, in the direction toward staging shelf 43. The rearward edge of the cassette will then hit pin 63, rotating the cassette in a clockwise direction for 90 degrees to align the length of the case in a horizontal direction and to align the width of the cassette to extend vertically.

Once the cassettes passing through chute 53 are rotated in selected rotational directions, either clockwise or counter-clockwise as viewed from the front of processing system 11, stepper motor 61 will again be actuated to move belt 59 so that the cassette is moved toward lid orientation section 65. Once the cassette is rotated so that the length is horizontally oriented, there is adequate vertical clearance between pin 63 and the uppermost edge of the cassette so that the cassette will pass beneath pin 63 when pin 63 is extended into chute 53.

Orienting means 52 further includes lid orientation section 65, which in part defines an end portion of orientation chute 53. Lid orientation section 65 includes lid orientation arm 67 which is selectively positioned in either an upwards position or a downwards position, depending upon the direction which processing system 11 is going to rotate a particular cassette. Arm 67 is slidably mounted to vertical rod 69. A ball and rotary screw type drive 69 is selectively powered by stepper motor 70 to position arm 67 in a selected position. Lid orientation section 65 further includes cassette rotation pin 71, which is actuated by a solenoid to press against the flat side of a cassette passing within the end of chute 53, in the lid orientation section 65. Pin 71 will be actuated to extend perpendicular to the flat sides of the cases. Pressing pin 71 into a cassette at the end of chute 53 will cause the cassette to rotate either above or beneath arm 67, laying the flat side of the cassette on horizontal surface 73, depending upon the position of arm 67.

Orienting means 52 is operated so that lid orientation section 65 works in conjunction with hinge orientation section 57 to rotate the cassettes in different directions, depending upon the initial orientations of the cassettes detected by sensors 55. The cassettes are rotated in particular directions in orientation sections 57, 65 so that when the cassette is laying flat upon horizontal surface 73, the lid of the cassette is facing upwards on the top side of the cassette and the hinge is facing forward, toward the front of video rental processing system 11.

Figure 5:
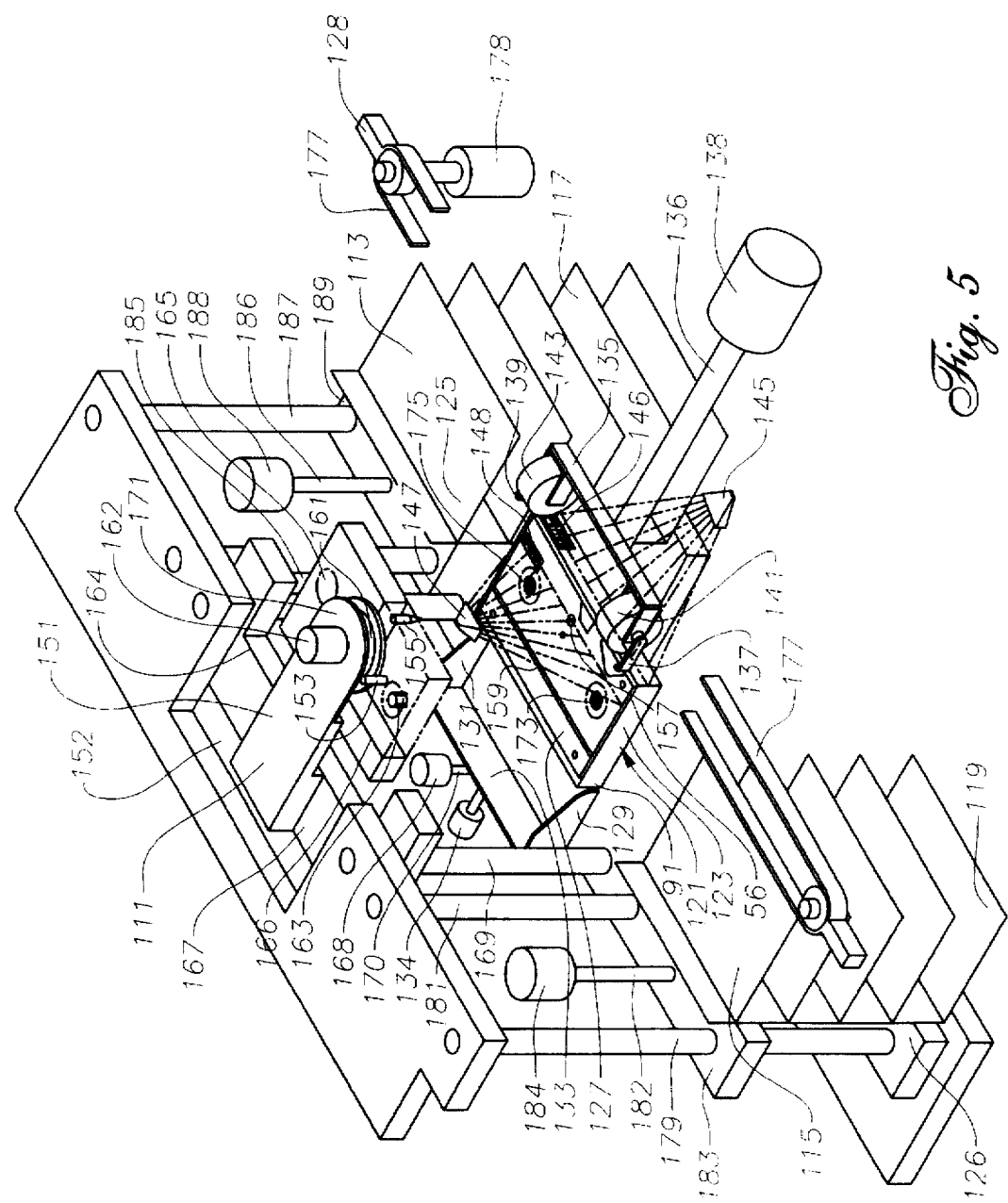
FIG. 5 depicts a perspective view of a rewind and cassette identifier detection section of the video rental processing system of FIG. 1.

If processing system 11 determines, by the relative detection of tab 58 and the hinge of a cassette (shown in FIG. 5)

at sensor 55, that the bottom of the cassette should move rearward first while the top of the cassette is retained in position by lid orientation arm 71, lid orientation arm 67 will be placed in an upwards position. If it is determined that the opposite side of the cassette from which cassette rotation pin 71 presses should lay flat against horizontal surface 73, lid orientation arm 67 will move downward on vertical rods 69 to a downwards position and cassette rotation pin 71 then be actuated to press into the cassette of and flip the cassette over the top of lid orientation arm 67 so that the opposite side of the cassette lays flat on horizontal surface 73. Thus, one cassette will rotate in one direction within hinge orientation section 57 and another direction within lid orientation section 65 if the notch 56 (shown in FIG. 5) is sensed in a particular position, than that which another cassette may be rotated if tab 56 (shown in FIG. 5) and the hinge of a cassette are sensed in a different relative positions by sensors 55.

The following Table A lists one example of how processing system 11 may be programmed to process cassettes to achieve the desired orientation based on the position of the hinges and lid sensed for the cassettes by sensors 55. In the table, "CW" stands for clockwise rotation and "CCW" stands for counter-clockwise rotation of cassette.

TABLE A

| Cassette Orientation | | Hinge Rotation Area | | Lid Rotation Area | |
| --- | --- | --- | --- | --- | --- |
| Hinge | Lid | CW | CCW | Top 1st | Bottom 1st |
| Left | Forward |  | x | x |  |
| Left | Rearward | x |  |  | x |
| Right | Forward | x |  | x |  |
| Right | Rearward |  | x |  | x |

The cassettes then pass to tray 75, and ejector 77 removes the cassettes from tray 75. Ejector 77 is driven by a ball and rotary screw drive 76, which is powered by motor 78 to advance ejector 77 from a retracted position for receiving cassettes onto tray 75 to an extended position for pushing cassettes from tray 75 into stacker section 81 (shown in FIG. 2).

Referring again to FIG. 2, feed means 31 further includes stacker section 81. Ejector 77 (shown in FIG. 3) will push cassettes from tray 75 into stacker section 81 after the lids of the cassette cases are properly oriented in passing through hinge orientation section 57 and through lid orientation section 65. Stacker section 81 provides both an accumulation and elevation means for both temporary storage within which the cassettes are stacked and moving the cassettes upward to cassette rewind and cassette identifier section 111.

Figure 4:
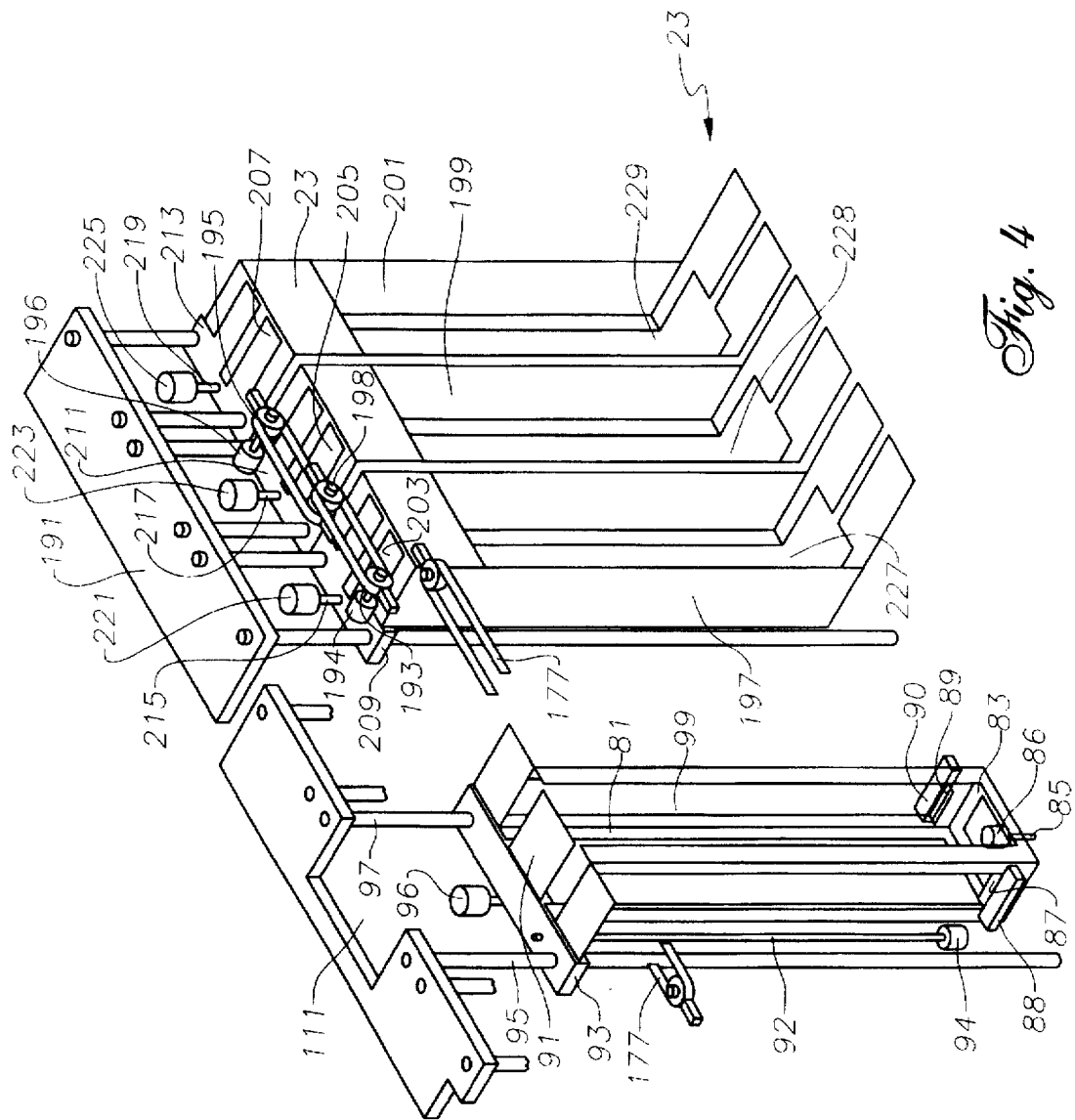
FIG. 4 is a perspective view depicting a stacker section for staging incoming cassettes and a discharge staging area for sorting and staging processed cassettes for removal from the video rental processing system of FIG. 1.

Stacker section 81 is shown in FIG. 4 in more detail. Stacker section 81 includes a support frame 83 onto which the cassettes are ejected by ejector 77 from tray 75 (shown in FIG. 3). Lower elevating pin 85 is powered by solenoid 86 to extend upwards and lift the cassettes upwards past retractable support arms 87, 89. Retractable support arms 87, 89 are moved inward into stacker chute 99 by solenoids 88, 90, respectively. An upward support plate 91 is mounted to elevator member 93, and is retractable from extending into stacker chute 99 by means of solenoid 96. Elevator member 93 traverses upwards and downwards on rods 95, 97 to position support plate 91 for lifting cassettes within stacker chute 99. Elevator member 93 is moved upwards by a ball and rotary screw drive 92, which is powered by stepper motor 94.

Numerous cassettes may be stacked within stacker chute 99, depending on the height of chute 99. Stacker chute 99 provides a staging and accumulation area within video rental processing system 11 for accumulating and staging movement of cassettes into rewind and identification section 111 while cassettes are processed in section 111 for variable lengths of time. When several cassettes are stacked within stacker chute 99 while awaiting movement into section 111 for processing, lower elevating pin 85 will be actuated to push upwards the lowermost cassette to a position slightly above retractable support arms 87, 89. Once the lowermost cassette is above retractable support arms 87, 89, retractable support arms 87, 89 will be extended into chute 99 and beneath the cassettes to support the cassettes within chute 99, as well as to support the other cassettes stacked within chute 99.

A new cassette may then be inserted beneath the other cassettes and retractable support arms 87, 89. Then, lower elevating pin 85 will push the new cassette upwards beneath the other cassettes stacked within chute 99 until the new cassette is immediately below retractable support arms 87, 89 and retractable support arms 87, 89 will then be withdrawn from within chute 99 so that the stacked cassettes will be supported upon the lowermost cassette. Then, lower elevating pin 85 will extend further upwards within chute 99 and retractable support arms 87, 89 may be extended beneath the new cassette to support the new cassettes and the stack of cassettes within chute 99, leaving support frame 83 open for receiving yet another cassette.

Upper support plate 91 is provided for selectively engaging the bottommost cassette of the stack of cassettes which are above plates 88, 89 within stacker chute 99. Upper support plate 91 is mounted to elevator member 93. Support plate 91 will be retracted and elevator member 93 will be lowered to lower support plate 91 until support plate 91 is aligned immediately beneath the bottommost cassette. Upper support plate 91 will be extended to pass beneath the bottommost cassette, until the bottommost cassette and the cassettes stacked above the bottommost cassette are supported by upper support plate 91. Elevator member 93 then will be operated to lift upper support plate 91 and the bottommost cassette upwards until the uppermost cassette in the stack in position for processing in rewind and cassette identifier detection section 111 (shown in FIG. 2).

Referring to FIG. 2, the uppermost cassette is raised from stacker section 81 and selectively positioned for processing in rewind and cassette identifier detection section 111. In rewind and cassette identifier detection section 111, the lid for the cassette is opened, a bar code identifier on the case of the cassette and another bar code identifier on the tape cartridge are read to determine if tape cartridge is correctly matched with a case. If a mismatch is found between the bar code for the tape cassette and the bar code for the case, then the tape cartridges are removed from the cases of the cassettes, the tape cartridges are stored in mismatched tape cartridge storage section 113 and the cases are stored in mismatched case section 115 on the appropriate shelves. Additionally, video cassettes are automatically checked for tape cartridge orientation within the case, checked to determine whether they are rewound, and then rewound and repositioned within the case.

It should be noted that in the preferred embodiment, tape cartridges will only be moved into mismatched storage section 113 and will only be rewound if system 11 is filled to less than 80 percent capacity in stacker section 81. If stacker section 81 is filled to 80 percent capacity or more, then tape cartridges which are not rewound, as well as mismatched video cassettes, will be sent to a reject bin within discharge staging area 23 for manual processing by a video store employee.

FIG. 5 depicts rewind and cassette identifier detection section 111 in more detail. Cassette 121 is shown while being supported upon upper support plate 91, after being presented to rewind and cassette identifier detection section 111. The upward facing surface of support plate 91 provides a support surface on which cassette 121 is supported. Cassette 121 includes case 123 having lid 125, which is shown in phantom. Lid 125 of case 123 is depicted as having been fully opened to expose tape cartridge 127 to lift and rewind head 151. Lid opening arms 129, 131 are mounted to frame 133, which is linearly moveable by actuating solenoid 134. Lid opening arms 129, 131 are moved forward with frame 133 to pass under lid 125 and along the sides of case 123 to press lid 125 upwards and partially open case 123. Lid opening arms 129, 131 do not fully open lid 125, but rather they operate to push a lid latch open and push lid 125 slightly upwards.

Plates 126, 128 and the upward facing surface of support plate 91 provide support surfaces which retain case 123 in a stationary position as frame 133 is moved forward to press lid opening arms 129 and 131 under lid 125 to snap lid 125 open. The hinge of cassette 123 is pressed back against plates 126, 128 to hold cassette 121 in position as lid opening arms 129, 131 are moved forward and pressed into cassette 121 to initially open lid 125 and then grasp lid 125. Plates 126, 128 are slotted so that conveyor 177 extends through the slots in plates 126, 128.

Lid holder 135 is movable in a horizontal plane to reciprocate in two directions, one direction being toward and the other direction being away from cassette 123 by means of ball and screw drive 136, which is powered by stepper motor 138. Lid holder 135 includes retractable catches 137, 139 which have support surfaces for extending underneath lid 125. Lid catches 137, 139 are selectively actuated to extend beneath lid 125 after lid 125 is initially and only partially opened by lid opening arms 129, 131. Lid catches 137, 139 are moved laterally inward toward the sides of cassettes by solenoids mounted next to rollers 141, 143. Once retractable catches 127, 139 are moved inward, towards one another, to extend beneath the interior surface of lid 125 for grasping lid 125, lid holder 135 is moved forward, toward the front of processing system 11 and away from case 123, to pull lid 125 fully open. Lid catches 137, 139 rotate as lid 125 opens, and springs pull catches 137, 139 back toward initial positions. Fully opening lid 125 fully exposes the upper side of tape cartridge 127 to lift and rewind head 151 for lifting cartridge 127 from case 125.

Rollers 141, 143 are mounted on lid holder 135 to for moving across the top of lid 125 to press lid 125 closed and seal case 123. Lid 125 is closed by first pulling retractable catches 135, 139 away from one another and laterally outward from lid 125. This releases retractable catches 135, 139 from holding lid 125 open. Lid holder 135 is then moved across the top of cassette 121, toward the rear of video rental processing system 11. Rollers 141, 143 are then passed across the top of lid 125, closing and snapping lid 125 shut to enclose tape cartridge 127 within case 123.

Once a case is opened, bar code reader 145 then scans bar code strip 146 on the exterior of case 123. Bar code reader 147 will then attempt to scan bar code strip 148 mounted on tape cartridge 127. Bar code strips 146, 148 provide indicator members which provide identifier codes for identifying video cassette 121, that is case 123 and tape cartridge 127, by means of a code which is unique for that video cassette. If the bar codes detected for both tape cartridge 127 and case 125 do not match, then cartridge 127 and case 125 will be identified as being incorrectly matched. As discussed below in more detail, tape cartridge 127 will then be moved onto shelves 117 and case 123 will be moved onto shelves 119 in mismatched tape cartridge and case storage sections 113, 115, respectively. A mismatched tape cartridge and case will be appropriately tracked to determine upon which shelf they are staged as they wait for the matching case or tape cartridge, respectively.

If bar code reader 147 cannot read the bar code on tape cartridge 148, lift and rewind head 151 will be actuated to lift tape cartridge 127 and re-orient cartridge 127 by rotating cartridge 127 180 degrees within a horizontal plane. Lift and rewind head 151 is mounted to elevator member 167 and traverses upwards and downwards on rods 169, 171. A ball and rotary screw drive 168 is powered by motor 170 to move elevator member 167 upwards and downwards on rods 169, 171. Lift and rewind head 151 includes support member 152 from which pin 153 and expandable, latching pin 155 extend. Pins 153, 155 are mounted to rotor 161, which is rotatably mounted to support member 152.

Pins 153, 155 extend downward from rotor 161 and support member 152 in alignment for extending into holes 157, 159 in tape cartridge 127 when support member 152 is moved downwards toward tape cartridge 127. Hole 157 is larger than hole 159. Latching pin 155 has a width, or diameter, which can be selectively expanded from a contracted position for inserting into and removing from one of holes 157, 159, to an expanded position for gripping within one of holes 157, 159 to latch tape cartridge 127 to rotor 161 and support member 152 for lifting upwards and from within case 123. Pin 153 is smaller than latching pin 155, and presses a tape cartridge release within hole 159 to allow the tape cartridge to be rewound.

The orientation of tape cartridge 127 in relation to case 123 and rewind head 151 is determined by whether pins 153 and 155 will register with and then enter holes 157, 159, respectively. Latching pin 155 is to large to pass into hole 159. If pins 153, 155 will not pass into holes 157, 159, then they will be rotated 180 degrees in a horizontal plane so that they register with and are inserted into holes 157, 159, respectively. If pins 153, 155 will not insert into holes 157, 157 after being rotated 180 degrees, the tape cartridge 127 will be enclosed within case 123, and the pair will be moved to a reject bin in discharge section 23.

Pins 153, 155 are rotated in a horizontal plane by means of rotor 161, which is mounted to the shaft of motor 162 for rotating around axis 164 for 180 degrees of rotation. Pins 153 and 155 are mounted directly to rotor 161 for engaging within holes 157, 159 in tape cartridge 127 to lift and then rotate cartridge 127 for 180 degrees relative to case 123. Pins 153, 155 rotate with rotate with rotor 161 for 180 degrees in a horizontal plane, which rotates tape cartridge 127 in a horizontal plane for positioning tape cartridge 127 in the appropriate direction in case 123 for bar code reader 147 to scan the bar code strip 148 on tape cartridge 127.

Preferably, cases have internal prior art posts which assure that tape cartridges can not be placed upside-down within the cases. Thus, tape cartridges need not be turned over within the cases of cassettes, but may only require rotating 180 degrees in a horizontal plane in relation to cases which are laid with the flat sides of the cases parallel to the horizontal plane.

Rewind spindles 163, 165 are also provided on lift and rewind head 151. Rewind spindles 163, 165 are mounted to support member 166, which is partially shown in phantom. A motor rotates spindles 163, 165 to rewind tape cartridge 127. All tape cartridges which are in appropriately matched cases are checked to determine if they are rewound, and if not are rewound, if stacker section 81 is filled to less than 80 percent capacity. It should also be noted that only one rewind spindle is required for rewinding tape cartridges. However, a second rewind spindle is preferably provided for properly tensioning the tapes within the tape cartridges being rewound.

Rewind spindles 163, 165 will engage within splined holes 173, 175 of tape cartridge 127 for rewinding the video tape within tape cartridge 127. Preferably, tension detection means is connected to one of spindles 163, 165 for detecting when tape cartridges are fully rewound. In other embodiments, the torque applied to one of spindles 163, 165 can be detected to determine when tape cartridges are fully round. Rewind spindles 163, 165 will apply rewind torque to a tape cartridge for three to five seconds to determine whether a tape is rewound. If stacker section 81 is filled to less than 80 percent of capacity, the tape cartridge will be rewound if it is correctly matched to a corresponding case. Tape cartridges are typically not rewound until they are being placed in the cases for checking into inventory and passing to discharge staging area 191 (shown in FIG. 4). If stacker section 81 is filled to 80 percent capacity or more, the tape cartridge will be placed back into the case, the case will be closed and then the case and tape cartridge will be placed within the reject bin within discharge staging section 23 for manual processing.

If the bar code on tape cartridge 127 appropriately matches the bar code on cassette case 123, tape cartridge 127 is rewound and placed back into case 123. Then, retractable catches 137, 139 are moved outward from retaining lid 125, and lid holder 135 is moved over the top, towards the rear of video rental processing system 11, so that rollers 141, 143 pass over the top of lid 125, closing lid 125 and latching it to case 123. Thus, tape cartridge 127 is sealed within case 123 and cassette 121 continues on to discharge staging area 191 for sorting into discharge bins according to selected entertainment categories.

Belt drive 177 moves cassette 121 from above upper support plate 91 to either pass cassettes to discharge staging area 191 (shown in FIG. 4), or to separately pass tape cartridges to mismatched tape cartridge staging area 113 and cases to mismatched case storage section 115. Belt drive 177 is powered by stepper motor 178 to move either cassettes, or separated tape cartridges and cases in either of two directions, left or right as viewed in FIG. 5. If the video rental processing system 11 has detected that tape cartridge 127 matches the case 123, then tape cartridge 127 is rewound and placed back into cassette case 123. Cassette lid 125 is then closed, and cassette 121 is moved into cassette discharge staging area 191 by conveyor 177.

If a mismatch is detected between tape cartridge 127 and case 123, they will be rematched with a correctly matching, corresponding case and tape cartridge, respectively, if the correctly matching case and tape cartridge are located within storage shelves 117, 115 and if stacker section 81 is not filled to 80 percent capacity or more. If stacker section 81 is filled to 80 percent capacity, they will be transported to a reject bin in discharge staging section 23 for manual processing by a video store employee.

Storage shelves 117 are included within mismatched tape cartridge storage section 113, and storage shelves 119 are included within mismatched case storage section 115. In the preferred embodiment, four of shelves 117 are provided in mismatched tape cartridge storage section 113 and five of shelves 119 are provided in mismatched case storage section 115 for processing up to five mismatched tape cartridges and tape cases at one time. A fifth tape cartridge will be held by lift and rewind head 151 and the top one of shelves 117 remains clear to allow movement of video cassettes to discharge staging area 23. In the preferred embodiment, processing system 11 was provided with the capacity for staging five mismatched tape cases and tape cartridges since typically persons will not check out more than five videos and will check them all back in at the same time. Thus, the correctly matching tape cartridges and cases for mismatched cartridges and cases should be processed through video rental processing system 11 at the same time as the mismatched tape and cassette are identified. However, in other embodiments of the present invention, a different number of shelves may be provided for staging mismatched tape cartridges and cassette cases. Other embodiments may also eject mismatched video cassettes to a reject bin for manual processing, rather than automatically matching corresponding tape cartridges and cases.

Mismatched taped cartridge storage section 113 includes rods 185, 187 upon which elevator member 189 traverses upwards and downwards in vertical directions for aligning storage shelves 117 of tape cartridge storage section 113 with upper support plate 91 for receiving a mismatched tape cartridge when conveyor belt 177 is rotated in an appropriate direction. Mismatched case storage section 115 includes rods 179, 181 upon which elevator member 183 traverses upwards and downwards for receiving a mismatched case when conveyor belt 177 is operated in the appropriate direction. Ball and rotary screw drives 182, 186 are powered by stepper motors 184, 188, respectively, for moving elevators members 183, 189, respectively. Stepper motors 184, 188 are operated to line up a selected one of mismatched staging shelves 117, 119 for receipt of incorrectly matched tape cartridges and cases, respectively. If a tape cartridge is correctly matched within an appropriate case, stepper motor 188 will align the uppermost one of shelves 119 with support plate 91, and the cassette will be passed across the uppermost one of shelves 119 and into discharge staging area 191 (shown in FIG. 4) for sorting according to the selected entertainment categories.

Once a video cassette is placed beneath rewind head 151, and the case is opened, bar code readers 145, 147 will scan the bar codes and data processing system 300 (not shown in FIG. 5) will determine whether the tape cartridge and case are correctly matched. If a mismatch is detected and stacker section 81 is filled to more than 80 percent capacity, video rental return processing system 11 will close the tape cartridge in the case, and send the mismatched pair to a reject bin in discharge section 23 for manual processing. If stacker section 81 is filled to less than 80 percent capacity, video rental processing system 11 will attempt to match the tape cartridge and case to a corresponding case and a corresponding cartridge, respectively.

When tape cartridge 127 is mismatched with case 123, and stacker section 81 is filled to less than 80 percent capacity, tape cartridge 127 will be lifted above case 123 by lift and rewind head 151. Then, lid holder 135 will be operated to close lid 125 and conveyor belt 177 will move case 123 to the left, as viewed in FIG. 5, to move case 123 into storage racks 119 in mismatched case storage section 115. If the correctly matching case for tape cartridge 127 is within case storage section 115, it will then be retrieved from mismatched case storage section 115 and moved into position beneath the tape cartridge being held by rewind head 151. If the correctly matching tape case for tape cartridge 127, which is being held by rewind head 151, is not within storage section 115, then rewind head 151 will lower to place tape cartridge 127 on upper support plate 91, and belt 177 will move in the other direction to move tape cartridge 127 to the right, as viewed in FIG. 5, and into one of shelves 117 of mismatched tape cartridge storage section 113. Processing system 11 will track on which of storage shelves 117 tape cartridge 127 is stored and upon which of storage shelves 119 case 123 is stored. When correctly matching tape cartridges and cases for case 123 and tape cartridge 127, respectively, are detected at rewind head 151, they will be matched with the corresponding ones of case 123 and tape cartridge 127, and further processing to rewind and sort the video cassette will occur.

It should also be noted that if tape cartridges and cases are left in mismatched storage sections 113, 115 for an extended period time, then they will be automatically ejected to an appropriate bin in discharge staging area 191 for manual processing by a video store employee. A mismatched tape cartridge will be placed back within a mismatched case by reversing the operation of mismatched tape cartridge and case storage sections 113, 115, belt 177 and lift and rewind head 151 from that for storing the tape cartridges and cases in the mismatched staging areas 113, 115. Case lids will be closed to enclose the mismatched tape cartridges within the cases to prevent damage to the tape cartridges during transport. This will provide room in mismatched staging areas 113, 115 for receiving later processed, incorrectly matched tape cartridges and cases for rematching with appropriate cases and tape cartridges, respectively.

Also, if mismatched storage sections 115, 117 are filled to capacity, that is once a fifth mismatched tape cartridge and tape case are detected, then system 11 will be operated to place the remaining first-in of the mismatched tape cartridges and the remaining first-in tape of the cases together, close the tape case and then transport them to a reject bin in discharge staging area 23 for manual processing by a video store employee. In the preferred embodiment, the last-in mismatched tape cartridge and case will remain together while the remaining first-in tape cartridge is placed within remaining first-in case and then transported to the reject bin in the discharge staging area. After scanning bar codes 146, 148, the last-in tape cartridge will be enclosed within the last-in case, the case will be closed, and then the cartridge and case pair will be moved onto a free one of shelves 119 for momentary staging until the remaining first-in mismatched tape and the remaining first-in mismatched case are placed together and transported to the reject bin in discharge staging area 23. Then, the last-in mismatched tape cartridge and case will be moved back beneath rewind head 151 and processing will continue to rematch the last-in mismatched cartridge and case with the appropriate case and cartridge.

Referring to FIG. 4, after passing from rewind and cassette identifier section 111, cassettes will then be sorted within cassette discharge staging area 191 according to selected entertainment categories. The selected entertainment categories for cassettes are determined by the bar codes read by bar code readers 145, 147. Discharge staging area 191 includes conveyors 193, 195 and discharge staging bins 197, 199 and 201. Staging bin 197 is preferably a reject bin for in which video cassettes are stacked that require a video store employee's attention for manual processing. Discharge bins 199 and 201 correspond to different entertainment categories in which the video cassettes may be sorted. The entertainment categories typically will be selected according to those entertainment categories which would best aid video rental store employees in reshelving the returned video cassettes. Such entertainment categories would group together a sizeable volume of video rental cassettes which are stocked on shelves in the video store which are in close proximity to one another. Preferably, the number of bins actually included in discharge staging area 191 are selected according to a particular video stores needs.

Discharge staging bins 197, 199 and 201 include support plates 203, 205 and 207, respectively, for supporting video cassettes being stacked within discharge area 191. Support plates 203, 205 and 207 are each mounted on elevator members 209, 211 and 213, respectively. Elevator members 209, 211 and 213 are driven by ball and rotary screw assemblies 215, 217 and 219, respectively, and stepper motors 221, 223 and 225, respectively, to selectively position support plates at selected heights within bins 197, 199 and 201.

The bottom of belt conveyors 193, 195 are spaced approximately 1¼ to 1½ inches above a common elevational height, which is preferably a common datum plane or datum line, defined by the uppermost positions of support plate 91 and support plates 203, 205 and 207. The uppermost positions for support plate 91, and support plates 203, 205 and 207 are preferably at the same elevational height, which defines the common datum plane or datum line, so that a video cassette may be passed by belts 177, 193 and 195 from support plate 91, across the uppermost one of mismatched case storage shelves 119, and to a selected one of support plates 203, 205, 207. When a cassette is to be placed in a selected one of bins 197, 199 and 201, the one of support plates 203, 205 and 207 which is within the selected one of bins 197, 199 and 201 will be indexed downward beneath the common datum plane the thickness of the cassette case. As a cassette being sorted is transported across to a selected one of bins 197, 199 and 201 by belts 193 and 195, the cassette being sorted will fall downward onto the one of support plates 203, 205 and 207 which has been indexed downward the thickness of the cassette being sorted.

If video cassettes are stacked on any of support plates 203, 205 and 207, then two of support plates 203, 205 and 207, on which the cassette being sorted is not going to be stacked upon, will be indexed to a vertical height below the common elevational datum plane so that the top of the uppermost cassettes will be aligned at the same height as the uppermost position of support plate 91 and the top shelf of mismatched case storage shelves 119 (shown in FIG. 5). If other video cassettes are stacked upon the one of support plates 203, 205 and 207 for which the cassette being sorted is to be stored upon, then that support plate will be selectively positioned at a selected height beneath the common datum plane so that the top of the uppermost cassette in the stack will be at an elevation which is approximately one tape thickness beneath the common datum plane. This places the top of the uppermost cassette of the stack, on which the video cassette being sorted is going to be stacked on top of, approximately one tape thickness below the height of the tops of the other two cassettes stacked on the other two of support plates 203, 205 and 207.

A cassette being sorted will be pushed by belts 177, 193 and 195 to slide along the common datum plane from support plate 91, across the top shelf of mismatched case storage shelves 119 (shown in FIG. 2), and across the tops of the uppermost cassettes in the two of storage bins 197, 199 and 201 which are not selected for storage. The cassette being sorted will then fall into the appropriate one of bins 197, 199 and 201, on top of the uppermost cassette in that bin, with the top of the cassette being sorted falling to a height which is at the same elevation of the datum plane, even with the tops of the uppermost cassettes in the other two bins. This process will be repeated for later sorted cassettes.

Stack push plates 227, 228 and 229 are provided at the lower ends of discharge bins 197, 199 and 201, respectively, for pushing video cassettes stacked upon support plates 203, 205 and 207 forward within bins 197, 199 and 201, respectively, to the front of cabinet 23 (shown in FIG. 2). Push plates 227, 228 and 229 are moved forward and reward within bins 197, 199 and 201 by ball and rotary screw drives powered by stepper motors, similar to those discussed above for support plates 91, 203, 205 and 207. Pushing a stack of processed video cassettes forward and to the front of bins 197, 199 and 201 makes it easier for video store employees to remove processed cassettes from processing system 11, and stacking is continued in each of the respective bins behind a stack which is pushed forward waiting for the video store employee's attention. Push buttons 28 (shown in FIG. 1) are also provided on the front of processing system 11, and when pushed cause a stack of videos to be pushed to the front of a respective one of bins 197, 199 and 210, provided that there is not already a stack of videos already pushed forward in the respective one of bins 197, 199 and 201.

Pushing the cassettes forward also allows video store employees to more easily view the titles displayed on the hinges of the cassettes placed at the front of bins 197, 199 and 201. The video cassette cases, as discussed above, are oriented to where the hinges of cassette cases face towards the front of processing system 11, with lids for the cases oriented to face upwards on the top of the cases. Thus, if the hinges for cases are appropriately labelled, they may be viewed through the front of access doors 24 in the front of the discharge staging area 23 (shown in FIG. 1).

Referring to FIG. 1, indicator lights 27 are provided for alerting video store employees when any of the bins 197, 199 and 201 approach capacity. An indicator light 17 for a respective one of bins 197, 199, 201 will be turned on when a stack of video cassettes is moved forward within one of the bins, and then will begin to flash if the stack is not removed from that particular bin within a period of time, such as 10 minutes. Also, if any one of bins 197, 199 and 201 are filled to 80% of its capacity or more, an indicator light 27 for that particular one of bins 197, 199, 201 will begin to flash twice as fast as the rate at which it flashes before it reaches 80% capacity. If one of bins 197, 199, 201 is filled to its full capacity, an alarm will sound and the video rental processing system 11 may be programmed to shut down or to redirect video cassettes for stacking in another one of bins 197, 199, 201 if there is space available. It should also be noted that preferably, when any of the access doors 24 are opened for removal of cassettes from discharge bins 197, 198 and 201, processing system 11 will suspend processing operations which are affected by access doors 24 being opened. Those processing operations which are unaffected may continue. Opening access doors 19 preferably will automatically shut processing system 11 down. Audio alarms are also provided for indicating when discharge bins 197, 198 and 201 are filled to capacity, and for indicating when malfunctions occur within video rental processing system 11 which require store employee attention.

Figure 6:
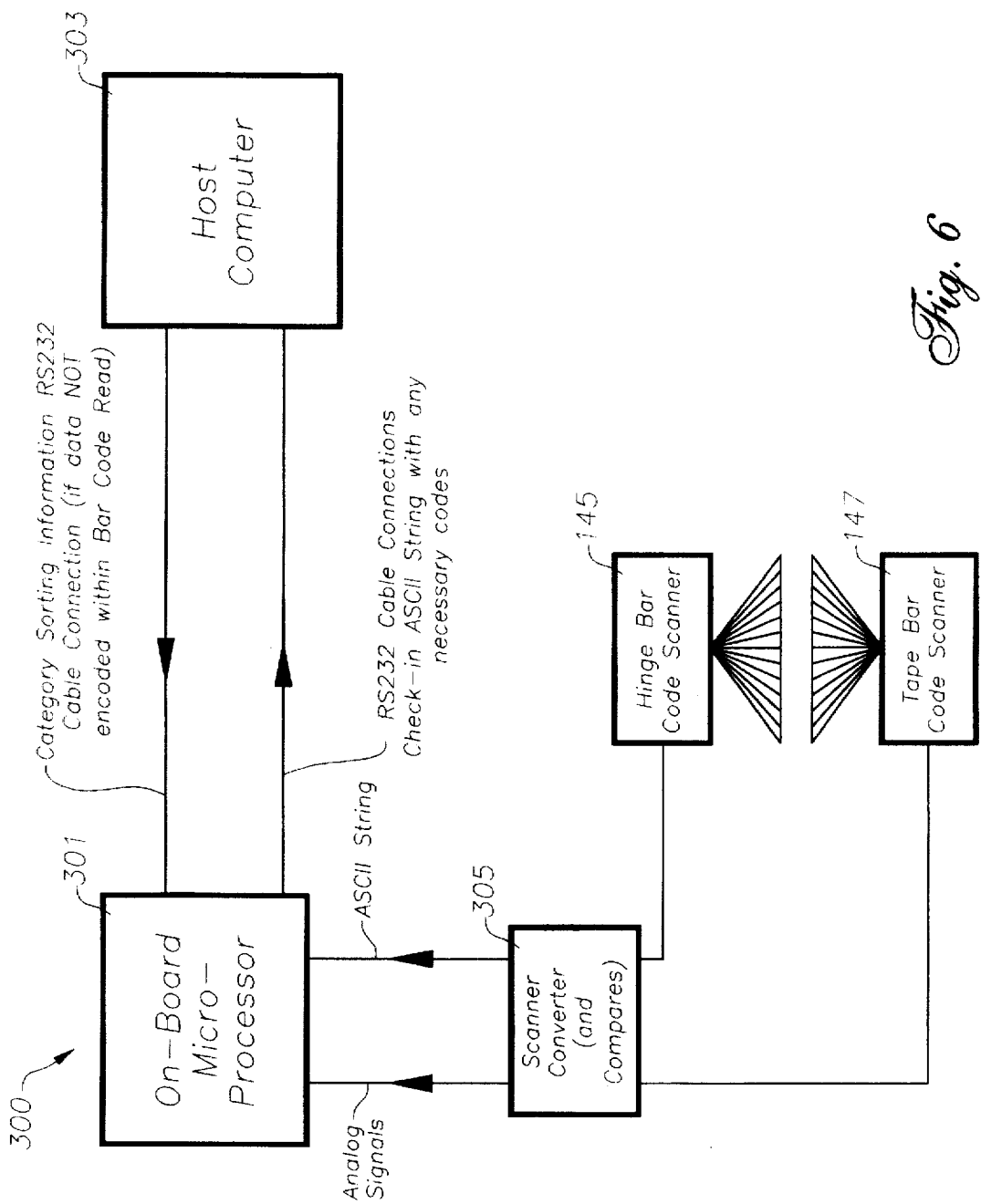
FIG. 6 is a schematic diagram depicting a programmable controller for controlling operation of video rental processing system of FIG. 1.
Figure 7:
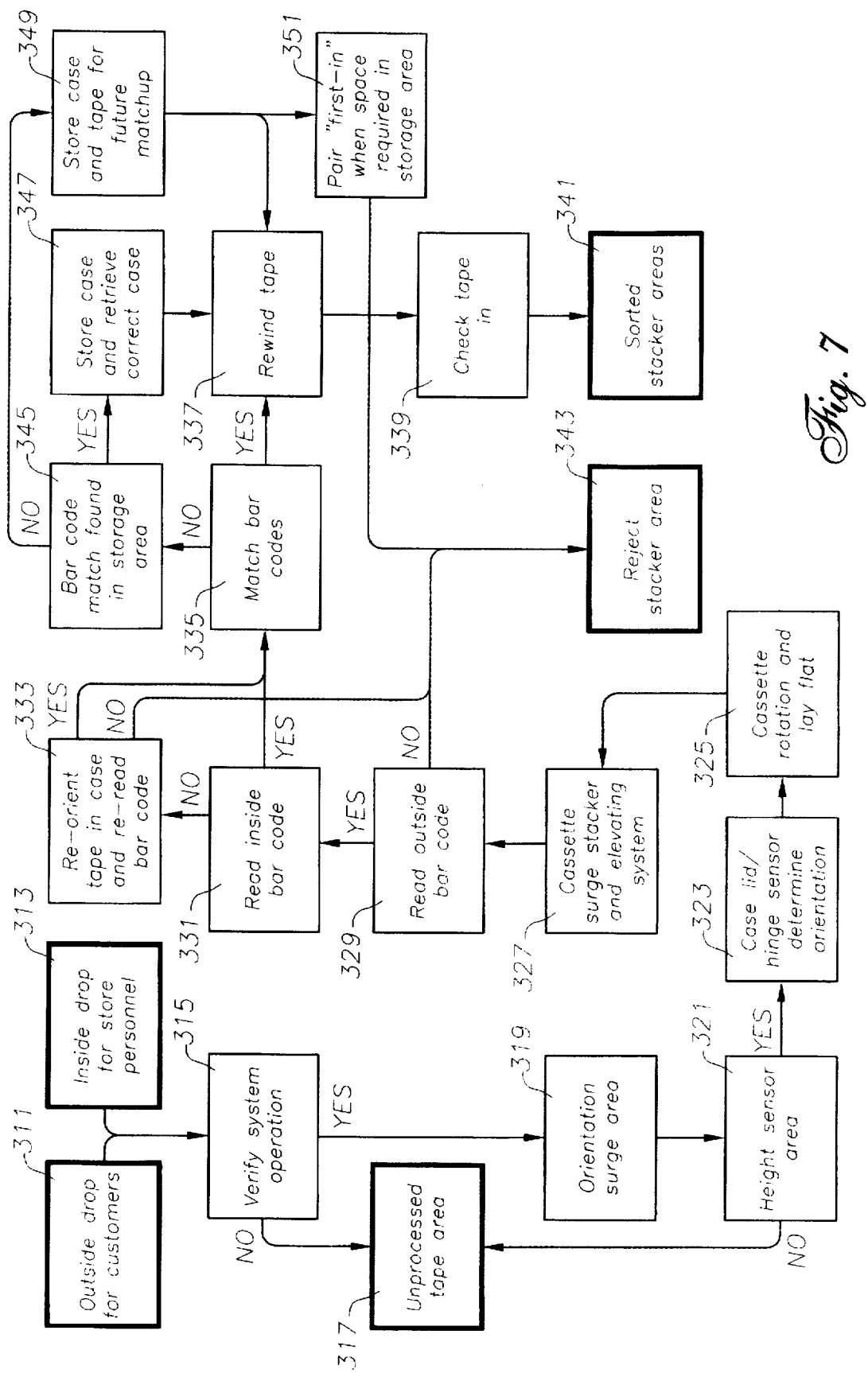
FIG. 7 is a block diagram which schematically depicts various steps for operating of the video rental processing system of FIG. 1.

FIG. 6 schematically depicts data processing system 300 for controlling for operating video rental processing system 11. Data processing system 300 for video rental processing system 11 will typically include on board microprocessor 301, which may be in turn connected to a host computer 303 in the video rental store. Either of microprocessor 301 or host computer 303 may be provided for tracking the inventory of video cassettes within the video rental store. A scanner converter and comparator 305 is provided for receiving data from bar code readers 145, 147. Scanner convertor and comparator 305 will compare the hinge bar code detected by bar code reader 145 with the tape cartridge bar code detected by bar code reader 147. The output from scanner converter and comparator 305 is then passed to microprocessor.

Microprocessor 301 controls actual operation of video rental processing system 11. Either microprocessor 301 or host computer 303 may be programmed to determine the type of entertainment categories by which the video cassettes are sorted with discharge staging area 23. The entertainment categories may be manually selected by a video store employee, or automatically selected by host computer 303 based upon the video rentals which are due to arrive back into the store. Additionally, processor 301 may send information to host computer 303 for checking returned cassettes back into inventory once they are detected by bar code readers 145, 147. Thus, a video rental store employee may immediately determine when a video cassette has been received and detected within video rental processing system 11.

Operation of video rental processing system 11 is now discussed with reference to the FIGS. 1 through 6, and FIG. 7 which is a block diagram depicting operation of video rental processing system 11. Block 311 depicts a customer dropping a cassette into drop slot 15, and block 313 depicts a video store employee, or other person, dropping a cassette through inside slot 17 and into video rental processing system 11. At block 315 operation of video rental processing system 11 is verified. If processing system 11 is either turned off, not operating properly, or full, returned video cassettes are then passed into a bin in unprocessed return storage area 21. If processing system 11 is operating correctly, video cassettes are passed from feed means 31 into hinge orientation section 57 and lid orientation section 65. Height sensor 47 will detect if a cassette of appropriate size is being processed. If it is, then in the step depicted in block 323, sensors 55 will detect the orientation of the lids and hinges of the video cassettes. Then, at block 325, the cassettes pass through hinge orientation section 57 and lid orientation section 65 to appropriately orient the cassettes. Then, as depicted in block 327, the cassettes are passed to stacker section 81.

The cassettes are then presented to rewind and cassette identifier detection sensor 111, as depicted by blocks 329, 331 and 333. Block 329 depicts reading a bar code from the bar code strip on the outside of a case. At block 331, once a case lid is opened and the tape cartridge is appropriately oriented, the tape cartridge bar code is read from the bar code strip on the tape cartridge. If the tape cartridge is not appropriately oriented, block 333 depicts rotating the tape cartridge 180 degrees relative to the case in a horizontal plane, and then bar code reader 147 will again attempt to read the bar code on the tape cartridge. Bar codes for the tape cartridge and case will be checked for a match as depicted in block 335. If the bar codes match and there is capacity left within stacker section 81, the video tape is rewound within the tape cartridge, as depicted in block 337. Then the bar code detected from the rewound tape cartridge is processed to check the video cassette into inventory, as depicted in block 339. In the step depicted in block 341, the rewound cassettes are then passed to discharge staging area 191 and sorted according to appropriately selected entertainment categories.

If the tape cartridge bar code cannot be read after the tape cartridge is reoriented in the case, by rotating the tape cartridge 180 degrees relative to the case, the tap cartridge will be reinserted into the case. In the step depicted in block 343, the lid of the cassette cases will then be closed, and the video cassettes will be passed to the discharge stacker area and placed in a reject discharge bin, which is one of discharge bins 197, 199 and 201. One of bins 197, 199 and 201 are preferably selected to provide a reject stacker area for those cassettes which require manual processing by a video store employee.

If the bar code on a case does not match the bar code of a tape cartridge when the two are compared in step depicted in block 335, then processing system 11 will proceed to step depicted in block 345. In the step depicted by block 345, processing system 11 will determine if the appropriate bar code match is found in mismatched storage sections 113, 115 for the inappropriately matched case or tape cartridge, respectively. If the appropriate match is found, then video rental processing system 11 will proceed to the step depicted by block 337, in which the appropriate tape cartridge is moved to support plate 91, picked up by lift and rewind head 151, rewound, and then placed in the appropriate case. The cassette, of a matching case and rewound tape cartridge, are then checked into inventory in the step depicted by block 339, then passed to discharge staging area 191 for placement in one of bins 197, 199 and 201, as depicted in block 341.

If in the step depicted in block 335, the appropriate match is not found within the mismatched storage area, the system will proceed to the step depicted in block 349 and store the cassette and/or tape cartridge in mismatched storage areas 113, 115. Later, if mismatched storage area shelves 117, 119 become full, the later mismatched tape and cases encountered in video rental processing system will match the first-in incorrectly matched tape cartridge to the first-in incorrectly matched case, enclose the first-in incorrectly matched tape cartridge within the first-in incorrectly matched case, and then pass the mismatched tape cartridge and cassette to the one of bins 197, 199 and 201 in discharge staging area 191 being used for a reject stacker area for manual processing, as depicted in block 343.

It should be noted that in other embodiments of the present invention, cassette indicators other than bar codes may be utilized. For example, letters or numerals may by be displayed for reading by a device which provides for optical character recognition. In some embodiments, color coding may be utilized, such as for indicating different ones of the selected entertainment categories. It should also be noted that other embodiments of the present invention may utilize different sensing means for determining the position of cassettes and system components within processing system 11, such as using optical sensors, inductive proximity sensors or other types of sensing means rather than microswitches.

Other embodiments of the present invention may also be provided for processing video cassettes in clear cases, in which there is not a particular matching case for the video cassettes, or video cassettes in cases in which there is an opening in the end of the cases rather than a lid on the flat side of the cases.

Additionally, other embodiments may simultaneously process other types of video rental units in other types of forms of video software other than video tape cassettes, such as game cartridges and laser discs.

The present invention provides several advantages over the prior art. A video rental processing system is provided for automating the processing of returned video cassettes. Cassettes are automatically oriented in the proper position for passing to a bar code reader and rewind head for determining if the appropriate tape cartridges are matched with the appropriate cases and rewinding the video tape in the tape cartridges. If the tape cartridges and cases are correctly matched, the video rental processing system will automatically check to see if the video tape in the tape cartridges has been rewound, automatically rewind the video tape in the tape cartridges and then close the cases with the tape cartridges enclosed within the cases. This automatic verification of appropriately matched tape cartridges and cassette cases, in addition to automatically rewinding the tape cartridges, should save numerous man hours currently spent making such verifications. Mismatched tape cartridges may also be automatically matched with the appropriate case, automatically rewound and then automatically sorted for reshelving by store employees.

Cassettes are preferably sorted according to selected types of entertainment categories, as indicated by the bar codes detected by the bar code reader. A discharge area is provided having a plurality of discharge staging bins which correspond to the selected entertainment categories, and in which processed cassettes are automatically placed according to the entertainment categories. Sorting the cassettes according to the selected entertainment categories aids video store employees in reshelving the video cassettes. Further, the cassettes are automatically logged back into inventory on a video store host computer according to the bar codes read from the cases and the tape cartridges.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

We claim:

1. An apparatus for automatically processing video cassette rental returns of video tape cartridges disposed within video cases, the apparatus comprising:

feed means for receiving and transporting the video cassettes;

orienting means for orienting the video cassettes being transported within the feed means to dispose the video cassettes to face in selected directions;

rewind determining means for checking to determine whether the video tape cartridges are rewound; and discharge means for removing the video cassettes from the rewind determining means and placing the video cassettes within a discharge staging area.

2. The apparatus according to claim 1, wherein the video cases have lids, and the apparatus further comprises:

opening means for opening the lids of the video cases to expose the video tape cartridges to the rewind determining means; and closing means for closing the lids of the video cases to enclose the video tape cartridges within the video cases after the video tape cartridges are tested to determine whether the video tape cartridges are rewound.

3. The apparatus according to claim 1, further comprising:

a rewind head having a spindle which engages within a drive hole of the video tape cartridges and rotates relative to the video tape cartridges to rewind the video tape cartridges.

4. An apparatus for automatically processing video cassette rental returns of video tape cartridges disposed within video cases, the apparatus comprising:

feed means for receiving and transporting the video cassettes;

orienting means for orienting the video cassettes being transported within the feed means to dispose the cases to face in selected directions;

a rewind head having a spindle which engages within a drive hole of the video tape cartridges and rotates relative to the video tape cartridges to rewind the video tape cartridges; and discharge means for removing the video cassettes from the rewind head and placing the video cassettes within a discharge staging area.

5. The apparatus according to claim 4, wherein the video cases have lids for enclosing the video tape cartridges within the video cases, and the apparatus further comprises:

opening means for opening the lids of the video cases to expose the video tape cartridges to the rewind head; and closing means for closing the lids of the video cases to enclose the video tape cartridges within the video cases after the video tape cartridges are tested to determine whether the video tape cartridges are rewound.

6. A method for automatically processing within a video rental processing unit video cassette rental returns of video tape cartridges disposed within video cases, the method comprising the steps of:

providing a data processing system for automatically controlling operation of the video rental processing unit;

transporting the video cassettes into the video rental processing unit;

determining whether the video tape cartridges are rewound and emitting data signals to the data processing unit in response thereto; and transporting the video cassettes from within the video rental processing unit into a discharge staging area.

7. The method according to claim 6, further comprising the step of:

automatically rewinding at least ones of the video tape cartridges which are determined to not be rewound.

8. The method according to claim 6, further comprising the steps of:

detecting initial orientations of the video cassettes being transported within the video rental processing unit; and then, automatically rotating the video cassettes being transported within the video rental processing unit in selected rotational directions to dispose the video cassettes to face in selected lineal directions.

9. The method according to claim 6, further comprising the steps of:

detecting initial orientations of the video cassettes being transported within the video rental processing unit; then, automatically rotating the video cassettes being transported within the feed means in selected rotational directions to dispose the video cassettes to face in selected lineal directions; and automatically rewinding at least ones of the video tape cartridges which are determined to not be rewound.

* * * * *